E. F. ORNER.
SPRAG BRAKE.
APPLICATION FILED APR. 23, 1914.
1,103,821.
Patented July 14, 1914.
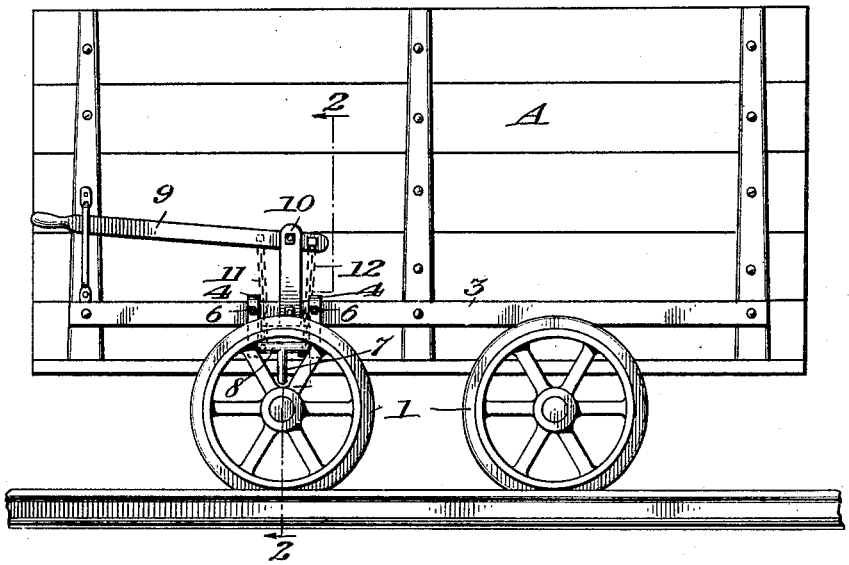
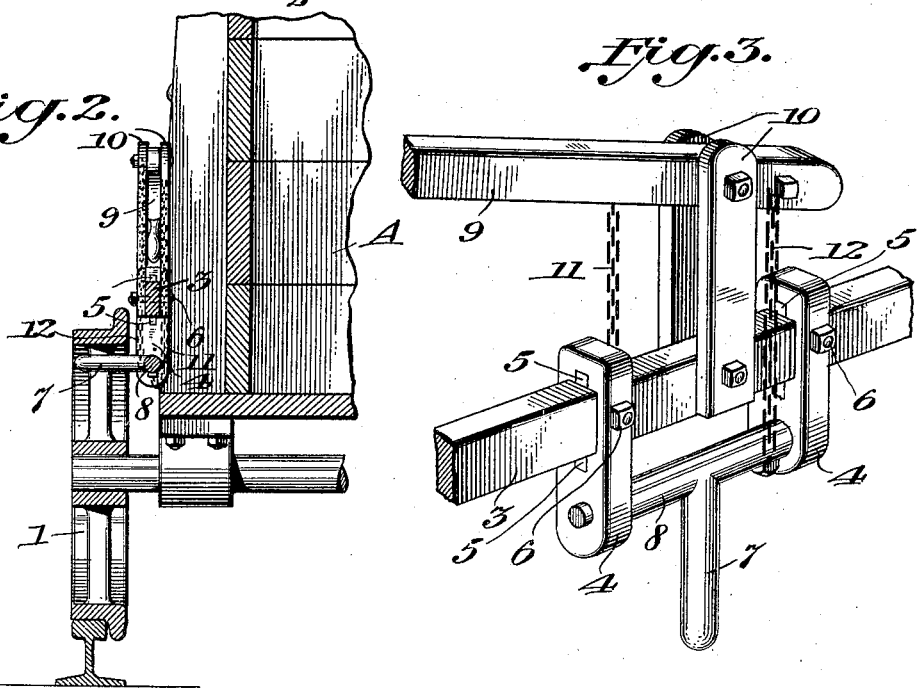
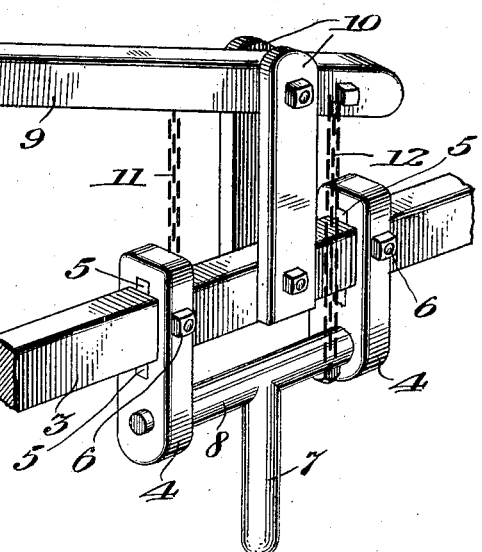
Witnesses:
Inventor:
Ellis F. Orner
By Louis Bagger & Co.
his Attys

UNITED STATES PATENT OFFICE.

ELLIS F. ORNER, OF GOWEN CITY, PENNSYLVANIA.

SPRAG-BRAKE.

1,103,821. Specification of Letters Patent. Patented July 14, 1914.

Application filed April 23, 1914. Serial No. 833,884.

*To all whom it may concern:*

Be it known that I, ELLIS F. ORNER, a citizen of the United States, residing at Gowen City, in the county at Northumberland and State of Pennsylvania, have invented certain new and useful Improvements in Sprag-Brakes, of which the following is a specification.

This invention relates to an improvement in sprag-brakes to be used on mine-cars and the like.

The object is to provide means for actuating the brake bar to cause it to enter between the spokes of a wheel when it is desired to stop or control the speed of the car.

The invention consists of certain novel features of construction and combinations of parts which will be hereinafter described and pointed out in the claim.

In the accompanying drawings:—Figure 1 is a view in side elevation showing the invention applied to a car; Fig. 2 is a vertical sectional view on the line 2—2 of Fig. 1; and Fig. 3 is a perspective view of the invention.

A, represents the car and 1, 1 are the wheels. Connected to and extending longitudinally of the car body is a bar 3, upon which is mounted hangers 4, 4. The hangers are connected to the bar by means of keys 5 and bolts 6, so that the hangers will remain in position.

A brake bar 7 is provided with a cross-head 8, which cross-head is journaled in the hangers 4.

A lever 9 is fulcrumed between uprights 10 connected to the bar 3. Chains 11, 12 are connected to the lever at diagonally opposite points, and the other terminals of the chains are connected to the cross-head 8.

When the lever 9 is drawn downward the chain 12 will cause the cross-head 8 to be rotated thereby moving the brake bar 7 to a horizontal position and between the spokes of the wheel 1, where it will be held until removed.

To remove the brake bar 7 from between the spokes of the car wheel the lever 9 is forced upward, and the chain 11 will be drawn taut, so that as the lever is moved upwardly the cross-head 8 will rotate and withdraw the brake bar from the wheel.

The brake bar 7 is normally in a vertical position, but upon the actuation of the lever 9 in a downward direction the brake bar will immediately be caused to move to a horizontal position and forced between the spokes of the wheel.

From the foregoing it will be seen that a very simple apparatus has been provided for braking mine cars, and as the device consists of few parts, the parts can be assembled or replaced very readily.

I claim:—

In a brake, the combination with a car body having wheels thereon, of hangers mounted on the car body, a brake bar journaled in the hangers and maintained normally in a vertical position, a lever pivotally mounted on the car body, and flexible means connected to the lever and brake bar for causing the bar to be actuated upon the movement of the lever to throw the bar either to a horizontal position to engage a wheel of the car or cause the bar to be swung from the horizontal position to a vertical position.

In testimony whereof I affix my signature, in the presence of two witnesses.

ELLIS F. ORNER.

Witnesses:
 PETER W. SCHLEIG,
 LILLIE A. SCHLEIG.

Copies of this patent may be obtained for five cents each, by addressing the "Commissioner of Patents, Washington, D. C."